United States Patent [19]
Meier

[11] Patent Number: 5,184,572
[45] Date of Patent: Feb. 9, 1993

[54] ANIMAL CONTROL CHUTE

[76] Inventor: Roch Meier, R.R. 32A, Menlo, Kans. 67746

[21] Appl. No.: 791,104

[22] Filed: Nov. 12, 1991

[51] Int. Cl.$^5$ .................. A01K 1/06; A01K 15/04
[52] U.S. Cl. .................................. 119/99; 119/98
[58] Field of Search ................. 119/91, 99, 100, 103, 119/19

[56] References Cited

U.S. PATENT DOCUMENTS

| | | | |
|---|---|---|---|
| 2,266,991 | 12/1941 | Richins | 119/20 |
| 2,616,392 | 11/1953 | Hutchins | 119/20 |
| 2,678,631 | 5/1954 | Hagar | 119/99 |
| 2,733,685 | 2/1956 | LaRue | 119/20 |
| 2,786,449 | 3/1957 | Dahlerup | 119/99 |
| 3,099,249 | 7/1963 | Newhouse | 119/99 |
| 3,115,670 | 12/1963 | Hlavacek et al. | 452/54 |
| 3,229,667 | 1/1966 | Stack | 452/54 |
| 3,237,602 | 3/1966 | Rens | 452/54 |
| 3,237,603 | 3/1966 | Markegard | 452/54 |
| 3,299,856 | 1/1967 | Fogle | 119/99 |
| 3,319,608 | 5/1967 | Klooster | 452/54 |
| 3,572,295 | 3/1971 | Tansel | 452/54 |
| 3,623,456 | 11/1971 | Priefect | 119/99 |
| 3,724,027 | 4/1973 | Zuber | 452/55 |
| 3,777,715 | 12/1973 | Hill et al. | 119/99 |
| 4,027,629 | 6/1977 | Pearson | 119/99 |
| 4,055,148 | 10/1977 | Brockman et al. | 119/103 |
| 4,116,166 | 9/1978 | Gofflot | 119/99 |
| 4,214,555 | 7/1980 | Sawby | 119/103 |
| 4,513,691 | 4/1985 | Wood | 119/99 |
| 4,930,450 | 6/1990 | Priefert | 119/103 |

*Primary Examiner*—John G. Weiss
*Attorney, Agent, or Firm*—Litman, McMahon & Brown

[57] ABSTRACT

An apparatus for confining and restraining a pig or other animal to facilitate veterinary operations includes a rectangular chute housing with an entrance and an exit gate at the two ends thereof. The exit gate includes a head clamp. Two movable sides, which are hinged at the top and which can be pushed together at the bottom by a series of levers and bearings, form a vise-like body clamp. A planar floor can be raised to an elevated position by another series of levers and bearings. The animal to be operated upon is loaded by walking up to the elevated floor on an integral loading ramp and is gripped by the head clamp and the body clamp. The floor can then be lowered so that the animal is immobilized since feet of the animal are not in contact the floor, and the veterinary operation performed. The head and body clamps are then loosened, the animal is safely dropped to the lowered floor, the exit gate is opened and the animal can exit under its own power. The operator manipulative ends of the levers and controls for the apparatus are located at a common location in close proximity to each other on one side of the chute to permit easy manipulation by a single operator and the operator is not required to lift the animal's weight at any time.

18 Claims, 5 Drawing Sheets

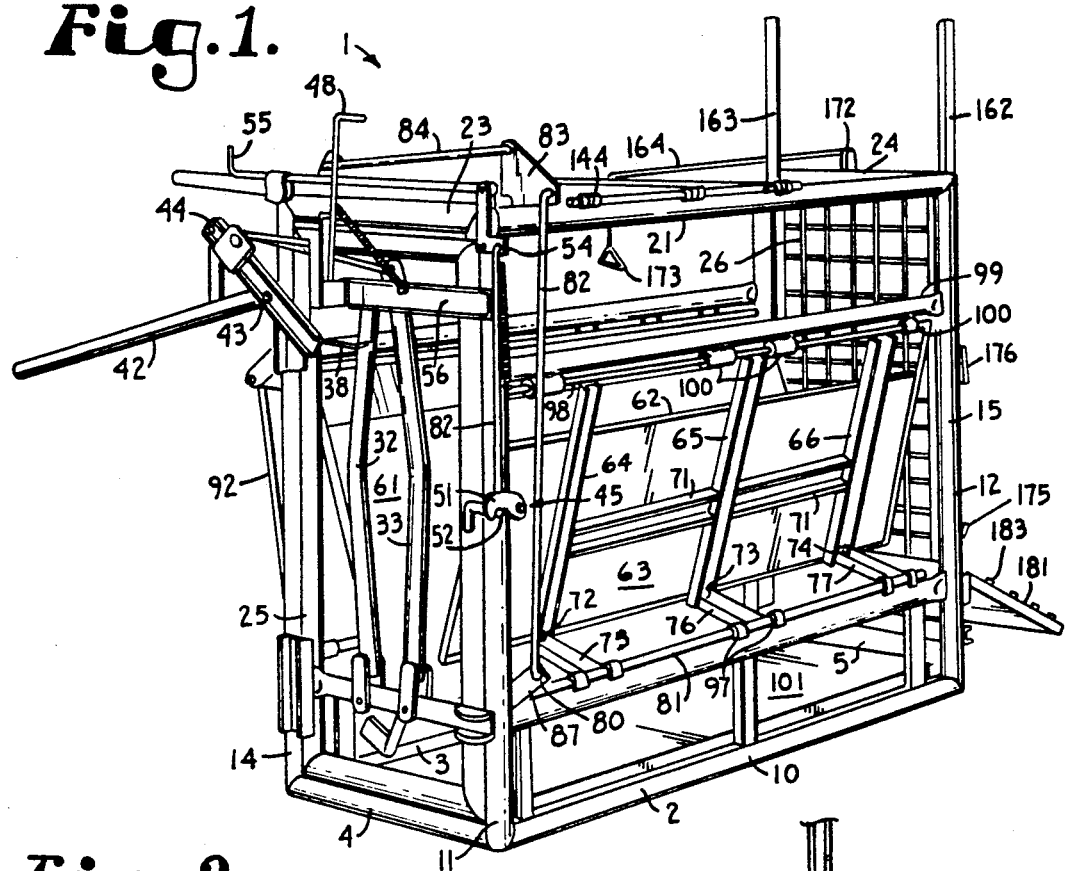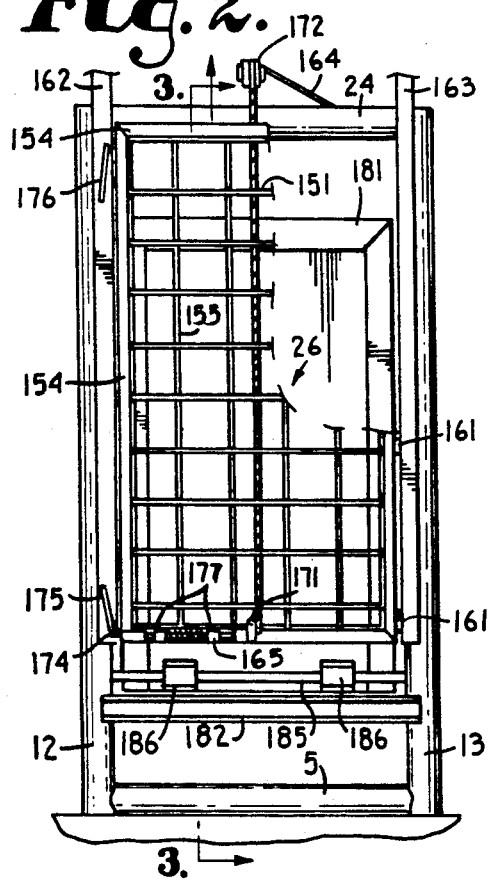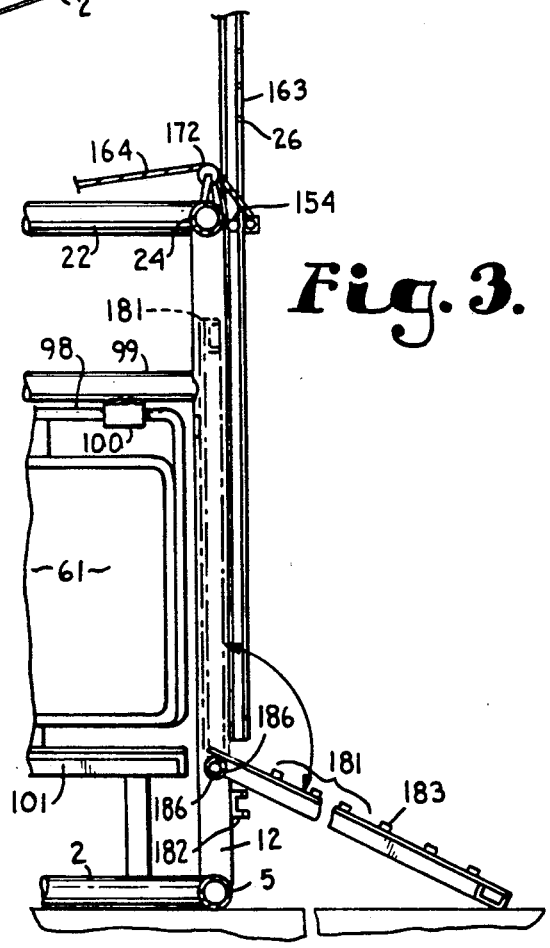

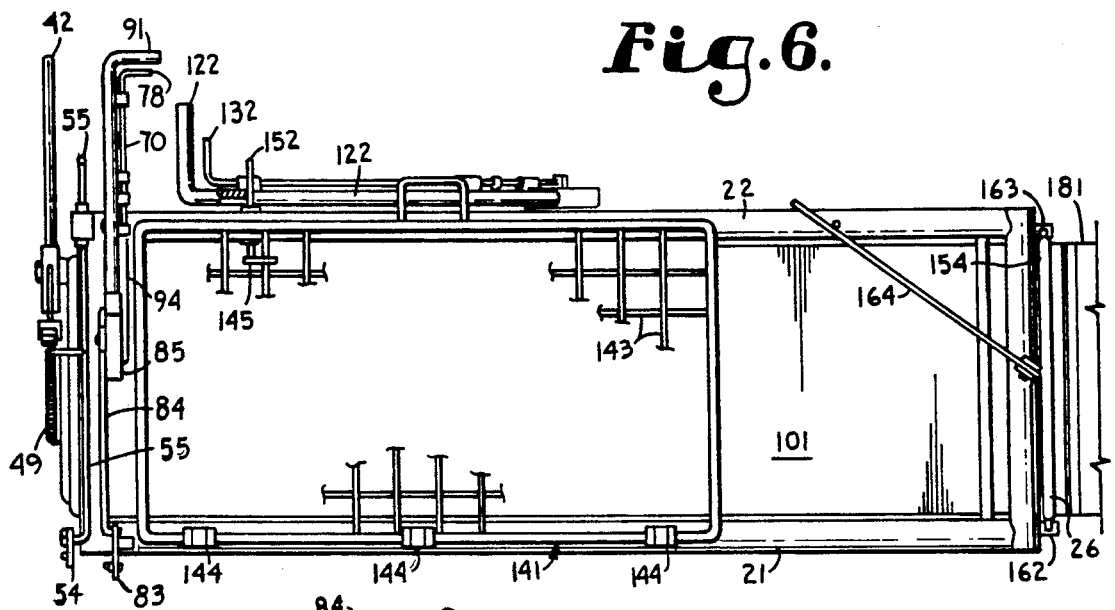
Fig. 6.
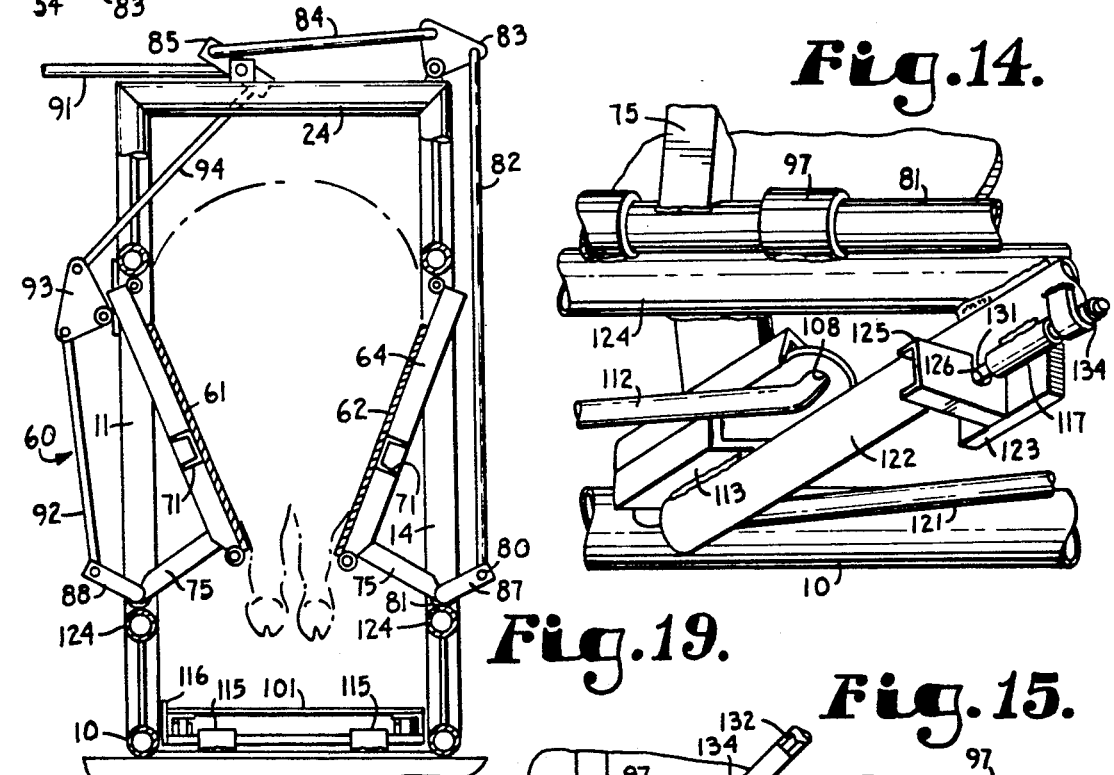
Fig. 14.
Fig. 19.
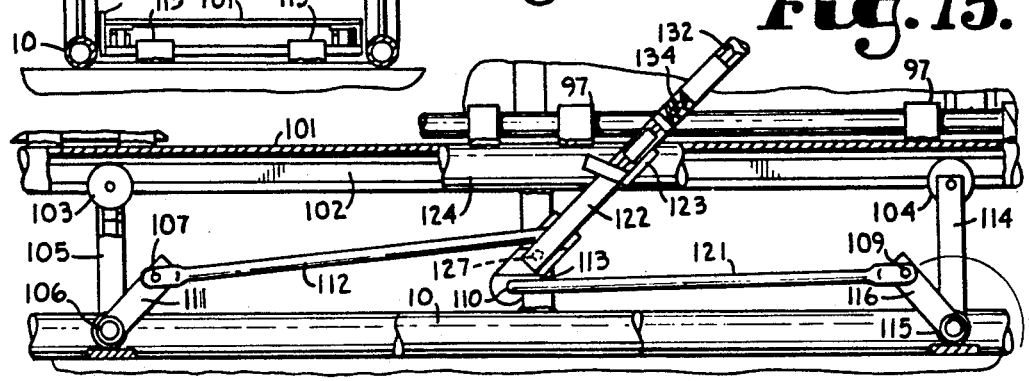
Fig. 15.

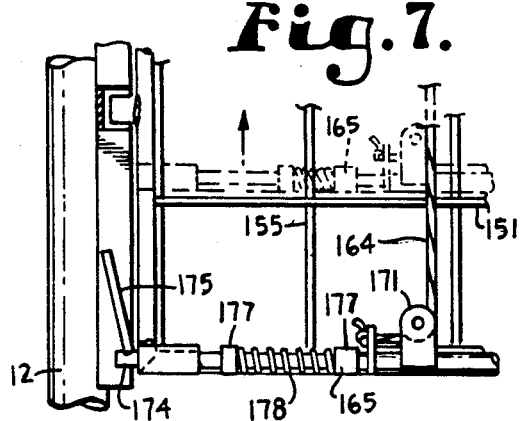
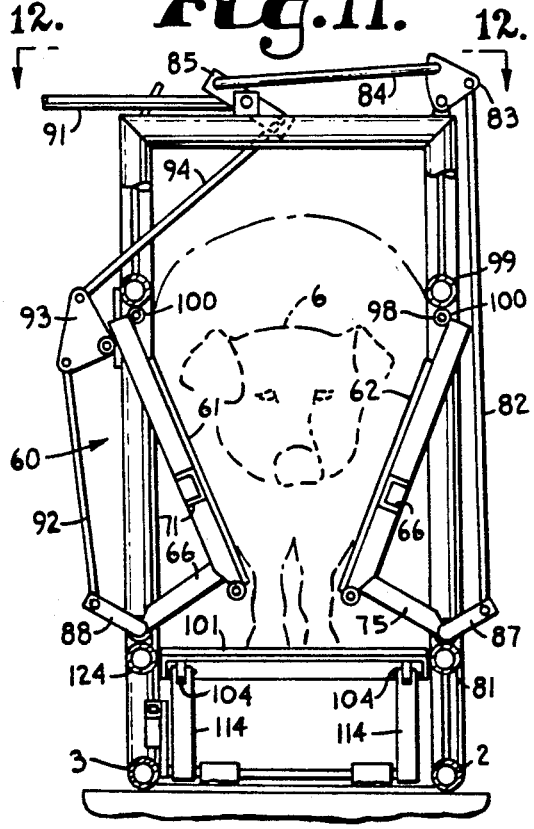
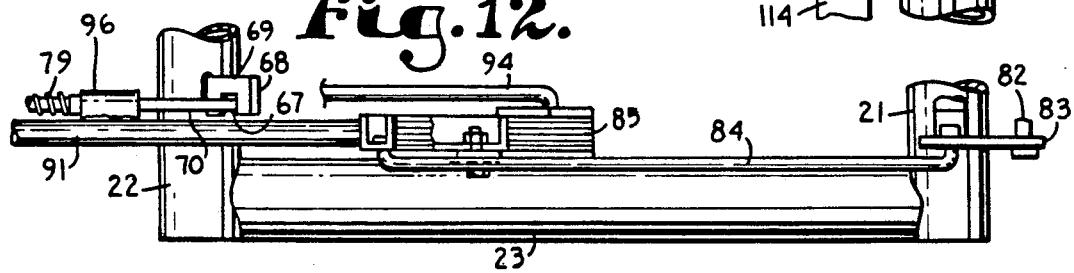
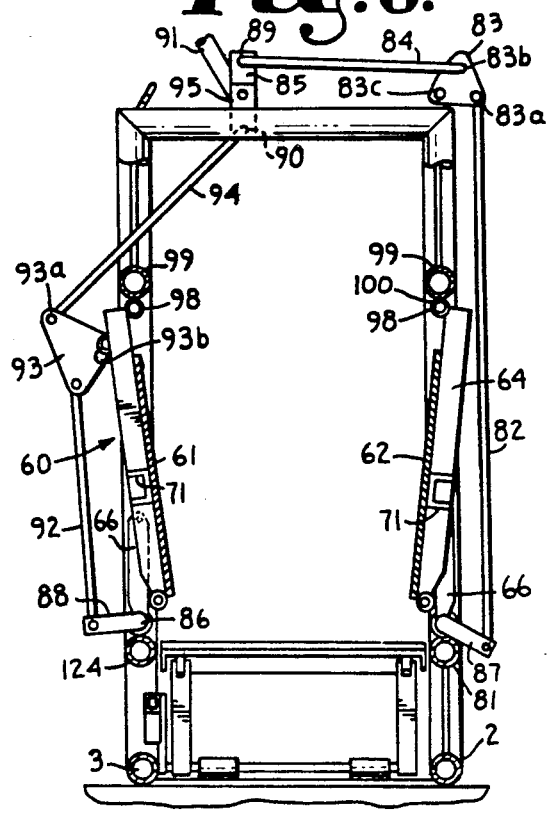
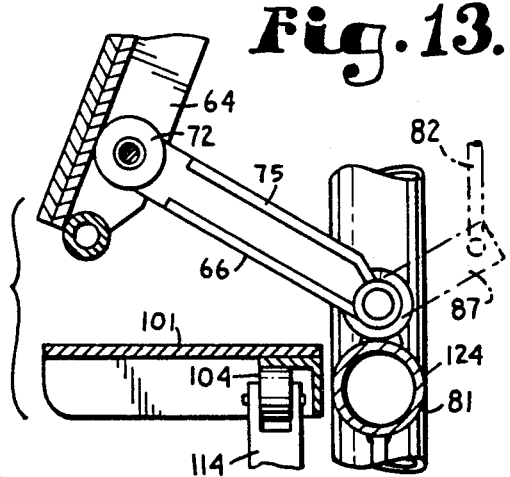

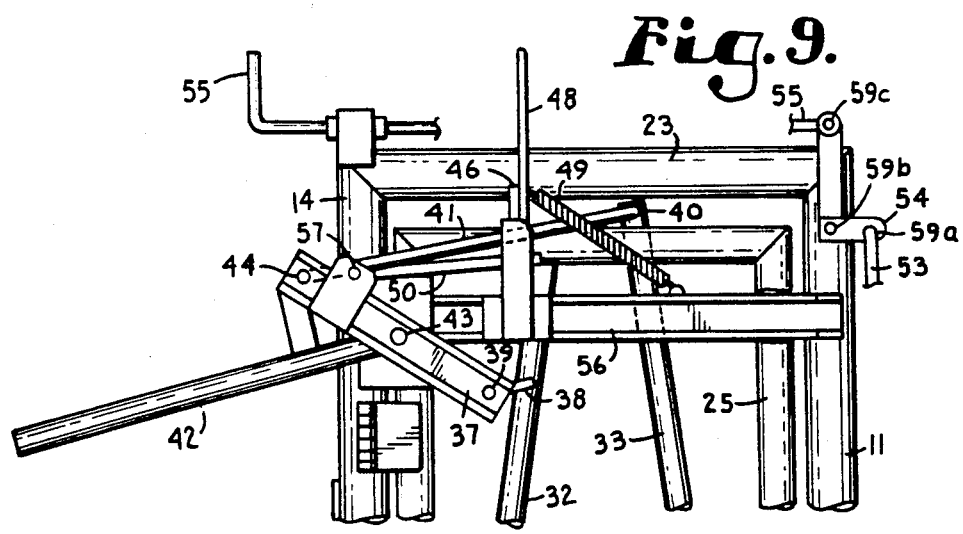
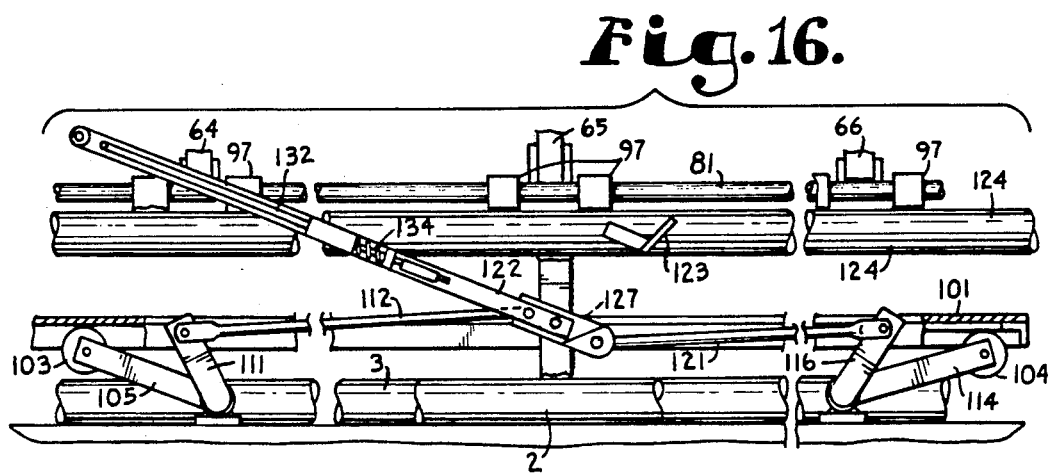
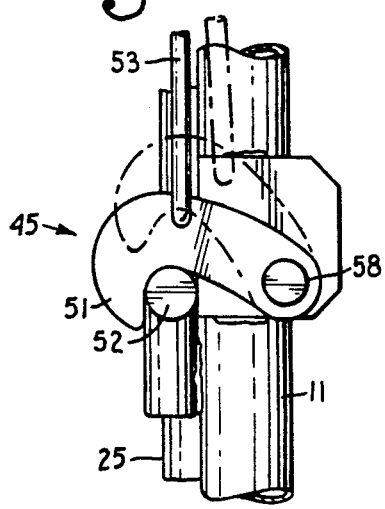
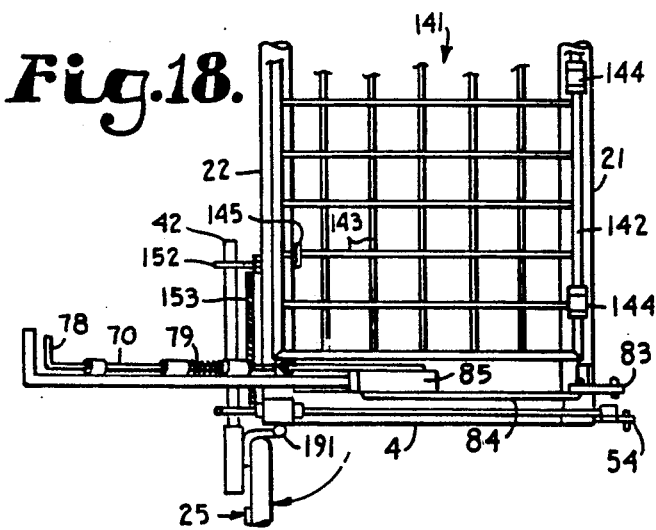

ANIMAL CONTROL CHUTE

BACKGROUND OF THE INVENTION

The present invention relates to a confining and restraining apparatus and system for pigs or other animals to facilitate their handling, especially during veterinary operations such as inoculations, castrations and the like.

The effective restraint of pigs and other livestock during veterinary operations has always presented a problem for farmers and veterinarians. The animal must be securely restrained for the protection of the person or persons administering the shot or other operation, hereinafter called the operator. At the same time, the restraining device must be constructed and used in a fashion which does not injure the animal.

Prior restraining devices have included simple chutes, clamping head gates, vise-like body clamps, and various combinations of these features. These devices have presented many problems.

In the case of simple confining chutes, the chute must necessarily be made large enough to accommodate a wide range of animal sizes. This means that smaller animals have plenty of room to maneuver to avoid the operator and, often to cause injury to themselves or the operator.

With a clamping head gate per se, the animals hind quarters are free to move about and kick and, again, the operator and/or the animal can be easily injured. Furthermore, to effectively restrain the animal, a head gate by itself must exert considerable pressure on the animal's neck which can result in injury to the animal as it struggles to free itself.

In the case of prior vise-like body clamps, to effectively restrain the animal by the vise action alone, these clamps must exert such pressure on the thoracic cavity of the animal that internal injury such as broken ribs and punctured lungs can result. Such body clamps are particularly damaging to the fetuses of pregnant animals.

Prior efforts to combine the above features into a single system have resulted in cumbersome devices which are not easily transportable, which include a considerable array of control levers and the like, often inconveniently located on several sides of the device, and which can require multiple operators for their effective use.

It is clear then, that a simple, reliable, and inexpensive restraining device which enables a single operator to conveniently load, restrain, and operate on an animal is needed. It is also clear that such an apparatus should be relatively easy to transport and should effectively restrain the animal without injuring either the animal or the operator.

SUMMARY OF THE INVENTION

The present invention is a restraining apparatus for effectively loading, restraining and releasing a pig or other animal to facilitate veterinary operations or the like. The apparatus includes a chute-like housing with an entrance opening and an exit opening. The entrance opening is covered by an entrance gate with a spring loaded latch which gate and latch are remotely controllable via a rope and pulley arrangement.

A hinged ramp folds down to allow an animal to climb up to an elevated floor. The chute above the floor has two sides which are pivotable at the top with the bottoms being urged toward each other to perform a vise-like body clamping action. Once the sides are clamped together on the animal, the floor can be lowered, leaving the animal's legs suspended above the floor. Thus the weight of the animal combined with the vise action of the sides provides an effective restraint without risk of injury to either the animal or the operator. For larger animals, a head clamp is provided in an exit gate at the exit end of the chute so that the animal's head can be restrained as well. When the operation is complete, the head clamp is loosened and the clamping sides are released, allowing the animal to drop to the lowered floor and easily exit the apparatus. The floor is then raised and the entrance gate opened to permit the egress of the next animal. The entire apparatus can be loaded onto a pick-up truck or other vehicle for easy transportation. All of the controls are conveniently located in close proximity to each other on one side of the apparatus, thus allowing a single operator to easily load, restrain, perform the operation, and release the animal.

OBJECTS AND ADVANTAGES OF THE INVENTION

The principal objects of the present invention are: to provide an improved animal restraining apparatus for effectively confining and restraining a pig or other animal during veterinary operations or the like; to provide such an apparatus which includes a remotely operated entrance gate to permit entry of the animal; to provide such an apparatus with an elevated floor which can be lowered by the operator; to provide such an apparatus with sides the bottoms of which can be urged toward each other in a vise-like body clamping action; to provide such an apparatus with a hinged loading ramp to facilitate the animal's entry to the elevated floor; to provide such an apparatus with a clamping head gate to further restrain the head and neck of larger animals; to provide such an apparatus with controls conveniently located in close proximity to each other on one side to permit a single operator to load, restrain, perform the operation, and release the animal without risk of injury to the animal or the operator; to provide such an apparatus which is relatively small, easily transportable and economically manufacturable; and, to provide such an apparatus which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a perspective view of a pig confining and restraining apparatus in accordance with the present invention.

FIG. 2 is an enlarged rear elevational view of the apparatus shown with an entrance gate partially open.

FIG. 3 is an enlarged partial cross-sectional view of the apparatus, taken along line 3—3 of FIG. 2, and illustrating the operation of the loading ramp with the ramp in a transport position being shown in phantom lines.

FIG. 6 is an enlarged top plan view of the apparatus, illustrating the location of various controls.

FIG. 7 is an enlarged, fragmentary view of the apparatus showing a spring latch mechanism of the entrance gate.

FIG. 8 is an enlarged front elevational view of the apparatus, illustrating clamping sides in a retracted position and with portions broken away to show interior detail.

FIG. 9 is a fragmentary and enlarged front elevational view of the apparatus, illustrating control details of a head gate closure.

FIG. 11 is an enlarged front elevational view of the apparatus showing a floor elevated and an animal being restrained by the clamping sides with portions broken away to illustrate interior detail.

FIG. 12 is a fragmentary and enlarged cross-sectional view of the apparatus, taken along line 12—12 of FIG. 11, with the clamping side controls positioned to restrain the animal.

FIG. 13 is a fragmentary and enlarged view of the apparatus showing a pivoting bearing arm for one of the clamping sides.

FIG. 14 is a fragmentary and enlarged perspective view illustrating details of a floor elevating and lowering system.

FIG. 15 is a fragmentary and enlarged side elevational view of the apparatus illustrating the floor elevating and lowering system in an elevated position.

FIG. 16 is a fragmentary and enlarged side elevational view of the apparatus illustrating the floor elevating and lowering system during a lowering operation.

FIG. 17 is a fragmentary and enlarged side elevational view of a latching mechanism for the exit gate.

FIG. 18 is a fragmentary and enlarged top plan view of the apparatus illustrating a top gate spring latch control lever.

FIG. 19 is an enlarged front elevational view of the apparatus showing the floor lowered and an animal being restrained by the clamping sides with portions broken away to show interior detail thereof.

DETAILED DESCRIPTION OF THE INVENTION

Figure 4:
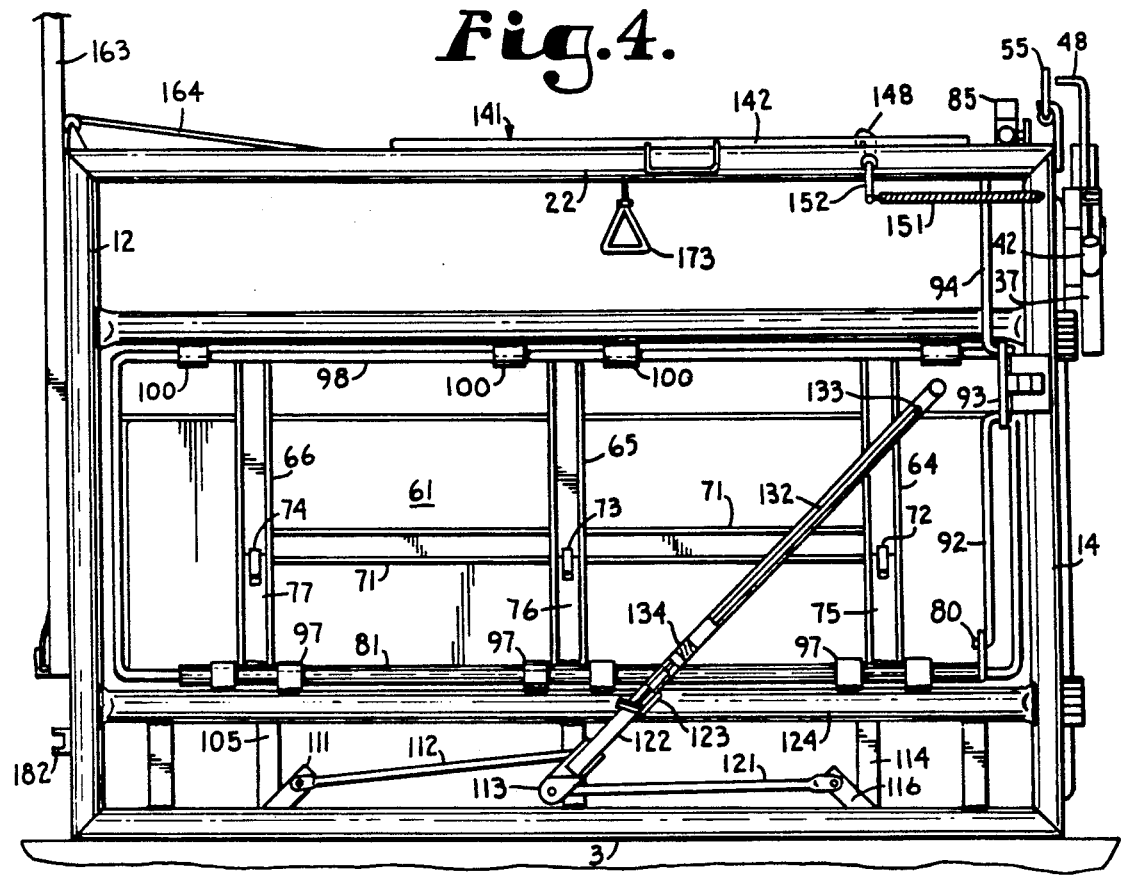
FIG. 4 is an enlarged side elevational view of the apparatus, showing the floor elevated.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limited, but merely as a basis for the claims and as a representative basis for teaching one skilled in the art to variously employ the present invention in virtually any appropriately detailed structure.

Referring to the drawings in more detail, reference numeral 1 generally represents an animal restraining apparatus in accordance with the present invention which, in the present embodiment, is especially sized and shaped to hold pigs but which can be utilized in conjunction with other animals, especially livestock with suitable adjustments in size and shape. The restraining apparatus 1 generally comprises a rectangular bottom frame 10 with bottom side frame members 2 and 3, a bottom exit frame member 4 and a bottom entrance frame member 5. The bottom frame members 2–5 are connected to each other and to four upright frame members 11–14 which are, in turn, connected to two top side frame members 21 and 22, a top exit frame member 23 and a top entrance frame member 24 to form a rectangular chute-like frame 15. A hinged exit gate 25 and a vertically operating entrance gate 27 are connected to the frame housing 15.

Figure 5:
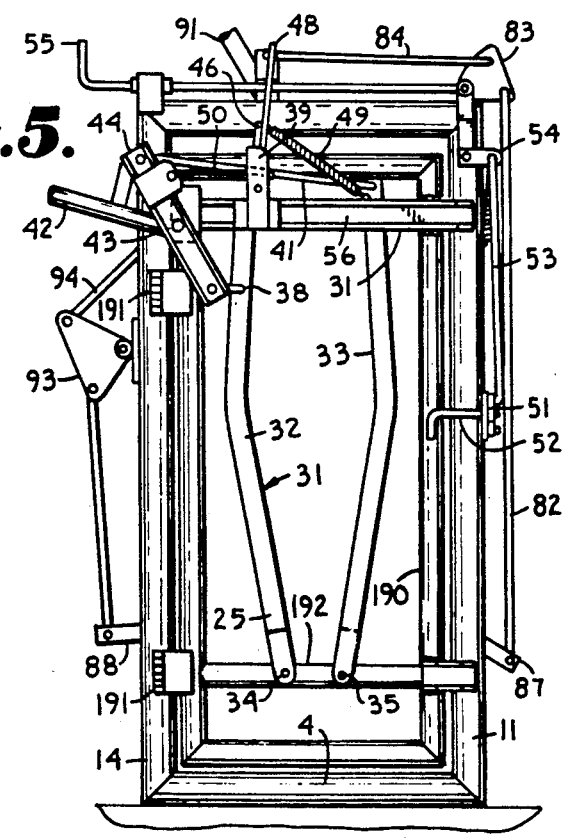
FIG. 5 is an enlarged front elevational view of the apparatus showing a head gate partially closed.

The exit gate 25, as better illustrated in FIG. 5, includes a clamping head gate 31 which, in turn, comprises left and right clamping bars 32 and 33, respectively. The clamping bars 32 and 33 are pivotally connected to a bottom cross member 36 at pivot points 34 and 35, respectively. As shown in FIG. 9, the left clamping bar 32 is pivotally connected to a head clamp lever arm 37 via a left connecting arm 38 at a pivot connection point 39 while the right clamping bar 33 is pivotally connected to the other end of the lever arm 37 via right connecting arm 41 at a pivot connection point 44. The arm 37 is pivotally connected to the frame housing 15 by a post at a pivot connecting point 43. The connecting arm 41 is pivotally connected to an upper end of the right clamping bar 33 at a connection 40. It is noted that most of the post type pivotal connections of the present invention, such as connection 40, are formed by a post on one element slidingly passing through an aperture in an opposite element and then being held in place by swaging, a cotter pin or the like. A "T" shaped elongate operating lever 42 is rigidly connected to the lever arm 37 at connecting points 43 and 44, but the lever arm 37 remains pivotable about the connecting point 43 and moves with the lever 42. To operate the head gate 31, an operator pulls down on the operating lever 42 which causes the lever arm 37 to pivot about the point 43. The lever arm 37 thus pushes the left clamping bar 32 to the right and simultaneously pulls the left clamping bar 33 to the left to produce a clamping pressure on the neck of an animal. A stanchion angle iron support 39 is secured to and extends upward from the gate 31.

Figure 10:
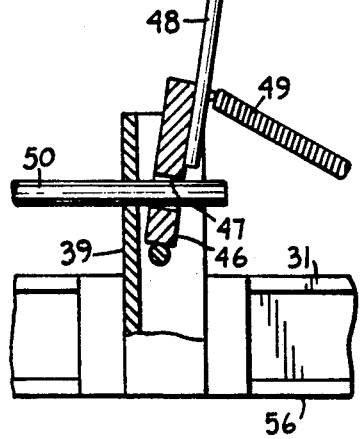
FIG. 10 is a fragmentary and enlarged front view of the apparatus, showing the details of a latching mechanism for the head gate.

FIGS. 9 and 10 illustrate a locking feature of the head gate 31. A pivotal plate 46 pivotally connected to the support 39 has a bore 47 drilled therethrough and a lock handle 48 rigidly connected thereto. A spring 49 is connected at one end to the lock handle 48 and at the other end to a gate cross member 56. A locking arm 50 is pivotally connected at a pivotal connection 57 to the lever arm 37, slidingly extends through the support 39 and further extends through the larger diameter bore 47. As the operating lever 42 is pulled downward to bring the clamping bars 32 and 33 toward each other, the locking bar 50 is pulled to the left through the bore 47. When sufficient tension is exerted against the animal's neck, the operating lever 42 is released and the spring 49 pulls the lock handle 48 and the plate 46 to the right (as seen in FIG. 10), thereby binding the locking lever 50 at opposite sides of opposite ends of the bore 47 and thus the head gate clamping bars 32 and 33 in place. To release the pressure on the head gate clamping bars 32 and 33, the operating lock handle 48 is pulled to the left (as seen in FIG. 10), releasing pressure on the locking arm 50 and the operating lever 42 is pushed upward, thus reversing the clamping action.

The exit gate 25 has a remotely operated latch 45 detailed in FIG. 17. The latch 45 comprises a hook 51 pivotally attached to the upright frame member 11 by a pivotal connector 58 and a cylindrical catch 52 attached to the exit gate 25. The hook 51 is connected via a pivoting connecting arm 53 and a pivoting "L" shaped bracket 54 to an operating arm 55 (FIGS. 1 and 9). The bracket 54 is pivotally connected to the arm 55 at pivotal connector 59a, to the frame member 11 at the pivotal connector 59b and to the operating arm 55 at the pivotal connector 59c. When the operating arm 55 is pulled by the operator, it causes the "L" shaped bracket 54 to pivot to the left (as seen in FIGS. 5 and 9), pulling the connecting arm 53 and the hook 51 upward to disengage the latch 45 and allow the gate 25 to be opened. Once the operating arm 55 is released, the hook drops back in place and the exit gate 25 will relatch itself merely by pushing it closed since the catch 52 urges the hook 51 upward due to its rounded shape upon closure until it is past the catch 52 at which time the hook 51 falls downward and captures the catch 52.

The restraining apparatus 1 also comprises a vise body clamp 60 having left and right clamping sides 61 and 62, respectively. Since the sides 61 and 62 are mirror images of each other, only the right clamping side 62 will be described in detail. Referring to FIGS. 1, 8, and 13, the right clamping side 62 comprises a rectangular planar surface 63 to which are attached three bearing tracks 64, 65, and 66. The tracks 64–66 are rigidly connected via cross members 71 to maintain their parallel spacing. Three roller bearings 72, 73, and 74 engaged in the tracks 64–66, respectively. The bearings 72–74 are connected to bearing arms 75, 76, and 77, respectively.

The bearing arms 75–77 are rigidly connected to a rotatable longitudinal shaft 81 which is connected to a generally vertical connecting arm 82 via a rigid connecting member 87 at pivotal connector 80. The vertical connecting arm 82 is pivotally connected to a top-mounted pivoting triangular plate B3 at pivotal connector 83a which is also connected to a generally horizontal connecting arm 84 at pivotal connector 83b and which pivots on the top frame member 21 about pivotal connector 83c.

Referring again to FIG. 8, the horizontal connecting arm 84 is pivotally connected to a body clamp lever arm 85 which is rigidly attached to a body clamp operating lever 91 at a pivotal connection 89. A matching longitudinal rotating shaft 86 of the left clamping side 61 is similarly pivotally connected to the body clamp lever arm 85 at pivotal connection 90 via a rigid connecting member 88, a generally vertical connecting arm 92, a side-mounted pivoting triangular plate 93 and a generally horizontal connecting arm 94. The plate 93 connects to the arm 94 at pivotal connection 93a, to the housing 15 at a pivotal connection 93b and to the arm 92 at a pivotal connection 93c. Note that FIG. 8 illustrates the body clamping sides 61 and 62 in their retracted positions. As shown in FIG. 8, the body clamp operating lever 91, when the body clamping sides 61 and 62 are retracted, is in a generally upward position.

A "U" shaped bracket 68 (FIG. 12) is attached to the top side frame member 22 and has an opening 69 cut therein to accommodate a pin 67 from a spring loaded locking bar 70 which is slidably received in and attached to the operating lever 91 by sleeve 96. The spring loaded locking bar 70 is equipped with a handle 78 near the top of the operating lever 91 (see FIG. 6). When the operating lever 91 is pulled downward by the operator, the body clamp lever arm 85 is pivoted about its central connection point 95 until the operating lever 91 rests on the top side frame member 22 and the spring loaded pin 67 engages and seats into the opening 69 in the bracket 68 thus locking the body clamp 60 in place. This pivoting action simultaneously urges the horizontal connecting arm 84 to the left and the horizontal connecting arm 94 to the right. This causes the triangular plates 83 and 93 to pivot, thus pulling vertical connecting arms 82 and 92, respectively, upward. The connecting arms 82 and 92, respectively, cause the right longitudinal shaft 81 to rotate counterclockwise and the left longitudinal shaft 86 to rotate clockwise. These shafts act to force the right bearing arms 75–77 and their left counterparts, respectively, downward urging the right and left clamping sides 62 and 61, respectively, inward to a clamping position via the action of the bearings within the bearing tracks on each side.

With reference to FIG. 1, the body clamp shaft 81 is pivotally mounted on the frame or housing 15 by a series of sleeves or journal bearing 97 welded to the housing 15. Likewise, an upper shaft 98 is secured to an upper frame member 99 by sleeves or journal bearings 100 that are welded to the frame member 99. The shaft 98 extends in a rectangular configuration about the changing side 61.

FIG. 11 illustrates the clamping position with a pig 6 restrained thereby. To release the clamping pressure, the operator pulls upward on the handle 78 of the locking bar 70 to urge the locking bar 70 outward against the action of a spring 79. This draws the pin 67 out of the opening 69 and allows the operating lever 91 to be returned to the vertical position, releasing the clamping pressure from the sides 61 and 62.

The restraining apparatus 1 is equipped with a rectangular planar floor 101 which can be raised and lowered. The floor 101 is operated in a fashion somewhat similar to the body clamping sides 61 and 62. As shown in FIGS. 4, 14, 15 and 16, the floor 101 has two bearing tracks attached to the underneath side thereof. Since the right bearing track and bearings are identical to the left, only the left track 102 will be described.

Referring to FIG. 15, the left bearing track 102 has two roller bearings 103 and 104 engaged therein. The bearing 103 is attached to one end of a bearing arm 105 which is pivotally attached at the other end to a pivot connection 106. The other end of the bearing arm 105 is also rigidly attached to one end of a short connecting member 111. The other end of the short connecting member 111 is pivotally connected to one end of a generally horizontal connecting arm 112 at pivot connection 107, which is connected at the other end to one end of a floor lever arm 113 at pivot connection 108. Similarly, bearing 104 is attached to one end of a bearing arm 114 which is pivotally attached at the other end to a pivot connection 115 and which other end is also rigidly attached to one end of a short connecting member 116.

The other end of the short connecting member 116 is pivotally connected at a pivot connection 109 to one end of another generally horizontal connecting arm 121, which is connected at the other end at a pivot connection 110 to the other end of the floor lever arm 113. The floor lever arm 113 is pivotal about a pivot connection 127 which is rigidly connected to a floor operating lever 122.

As shown in FIG. 14, the floor operating lever 122, when the floor 101 is in its elevated position, rests on a plate 123 attached to a side frame member 124. A "U"

shaped 125 bracket is attached to the plate 123 and has an opening 126 cut therein to accommodate a pin 131 from a spring loaded locking bar 132 which is attached to the operating lever 122 by a sleeve 117 welded to the lever 122. The spring loaded locking bar 132 is equipped with a handle 133 near the top of the operating lever 122 (see FIG. 4).

To lower the floor 101 from the elevated position of FIG. 15, the operator pulls upward on the handle 133 of the locking bar 132 to urge the locking bar 132 upward against the action of a spring 134. This draws the pin 131 out of the opening 126 and allows the operating lever 122 to be moved. The operating lever 122 is then pushed to the left (as seen in FIG. 4) which causes the lever arm 113 to rotate counterclockwise about the pivot point 127. This pushes the connecting arm 112 to the left while simultaneously pushing the connecting arm 121 to the right. The bearing arm 105 is thus rotated counterclockwise about the pivot point 106 while the bearing arm 114 is rotated counterclockwise about the pivot point 115, urging the bearings 103 and 104 to the left and the right, respectively in track 102 and causing the floor 101 to be lowered. To raise the floor 101, the operator simply pulls the operating lever 122 to the right, reversing the procedure, until the pin 131 latches into the opening 126, thus locking the floor 101 in the elevated position.

A rectangular top gate 141 (FIGS. 6 and 18) comprises a generally rectangular frame 142 with a wire mesh screen 143 covering the frame 142. The frame 142 has hinges 144 attached to the right side which hinges are also attached to the top right side frame member 21. A hook latch 145 is positioned to engage the wire mesh 143 when closed and thus retain the top gate 141 in a closed position. The latch 145 is attached to an "L" shaped handle 152 which extends through a bore in the top left side frame member 22 and which is attached to a spring 153. To open the top gate 141, the operator pulls the bottom of the handle 152 to the left against the force of the spring 153 which releases the hook latch 145 from its engagement with the wire mesh 143. The top gate 141 can then be raised to an open position to provide more complete access to a restrained animal.

The entrance gate 6 includes a slide gate 151 that is illustrated in FIGS. 2, 3, and 6. The slide gate 151 comprises a rectangular frame 154 covered with a wire mesh 155. The frame 154 has a plurality of roller bearings 161 attached to two sides thereof which bearings 161 engage a right extended vertical track 162 and a left extended track 163 which are attached to the upright frame members 12 and 13, respectively.

A cable 164 extends from a spring latch 165 at the bottom of the entrance gate 151 through a pulley 171 attached to the bottom of the frame 154, through a pulley 172 attached to the top entrance frame member 24 of the frame 15, and thence to a handle 173 (FIG. 4) positioned near the operator.

The spring latch 165 has a pin 174 which, when the gate 151 is in a closed position, engages a detente 175 attached near the bottom of the upright frame member 12 to hold the gate 151 closed and which similarly engages a detente 176 attached near the top of the upright frame member 12 to hold the gate 151 in an open position. The latch 165 is secured to the slide gate 151 by a pair of sleeves 177 and includes a biasing spring 178.

To open the gate 151, the operator merely pulls on the handle 173 which pulls the spring latch 165 to an open position, allowing the gate 151 to move upward within the tracks 162 and 163 until the spring latch 165 engages the top detente 176. To lower the gate 151, the operator again pulls the handle 173, releasing the pin 174 from the top detente 176 and then allows the gate to fall by the action of gravity until the pin 174 of the spring latch 165 again engages the bottom detente 175. The vertical operations of the entrance gate 151 and the latching action of the spring latch 165 prevents other pigs which are waiting to enter the apparatus 1 from rooting or jarring the entrance gate 151 open and interfering with the pig 6 which is already restrained.

A loading ramp 181 (FIG. 3) is hingedly connected between the upright frame members 12 and 13 for transport by journal shaft 185 to which the ramp 181 is pivotally connected by sleeves or journal bearings 186. Once the entrance gate 151 is opened, the loading ramp 181 is free to be rotated downward as shown in FIG. 3 until it rests on the ground and/or a "U" shaped support bracket 182 attached between the upright frame members 12 and 13. Note that the loading ramp 181 is equipped with traction enhancing ridges 183 to keep an animal from slipping during loading, and that the loading ramp 181 is positioned so as not to interfere with the action of the entrance gate 151 when the ramp 181 is either opened out or closed.

The clamping bars 32 and 33 are mounted on the exit gate 25 which is constructed of a rectangular frame 190 secured to the upright frame member 14 of the housing 15 by a pair of hinges 191 and which includes upper cross member 56 and a lower cross member 192.

To operate the pig restraining apparatus 1 to confine and restrain a pig 6 during a veterinary operation or the like, a single operator would raise the entrance gate 151 by pulling the handle 173 until the gate 151 was held open by the action of the spring latch 165. The pig 6 would then be urged up the loading ramp 181 and into the restraining device 1 until the entrance gate 151 could be lowered and latched closed. At this point, if the pig 6 were large, e.g. 400 lbs. or more, its head would be immobilized by clamping its neck in the head clamp 31 by pulling down on the operating lever 42. For smaller pigs on the order of 300 lbs. or less, the head clamp is normally unnecessary. When sufficient pressure was exerted on the pig's neck, the lever 42 would be released but the locking arm 50 and the upright plate 46 would hold the head clamp 31 in the desired position. Next the pig's body would be clamped by the left and right body clamping sides 61 and 62, respectively, by pulling down on the operating lever 91 until the spring latch 67 engages the opening 69 in the bracket 68. This retains the clamping sides 61 and 62 in position against the pig 6, as shown in FIG. 11.

The floor 101 would then be lowered by pulling up on the handle 133 of the locking bar 132 and pulling the floor operating lever 122 to the left. This suspends the pig 6 with its feet off of the floor and essentially immobilizes it by the use of its own weight as shown in FIG. 19. Required veterinary operations such as inoculations, castrations, etc. can then be performed without the threat of injury to either the operator or the pig 6. If greater access to the restrained pig 6 is required, the operator can pull the handle 152 to the left, thus releasing the hook latch 145 and then raising the top gate 141. Once the required operations are finished, the head clamp 31 can be released and the exit gate 25 opened by pulling on the operating arm 55 to open the hook 51 and swinging open the exit gate 25. The pig 6 can then be easily released by pulling open the spring latch 67 and pushing the operating lever 91 upward, releasing the body clamping sides 61 and 62 and allowing the pig 6 to harmlessly drop to the lowered floor 101 and exit through the open exit gate 25. The floor 101 is then raised to its elevated position and the entrance gate 151 opened for the next animal. Note that the operator is never required to lift the pig's weight, even with the help of a lever since, once the pig 6 walks up the loading ramp 181 to the elevated floor 101, the rest of the immobilizing operation is performed by gravity.

When all of the veterinary operations are finished, the loading ramp 181 can be raised, the entrance and exit gates 27 and 25, respectively, latched, and the entire apparatus 1 easily loaded onto a pick-up truck or other vehicle for transportation or moved inside for storage.

A preferred embodiment of the pig restraining apparatus 1 is constructed of steel and employs tubular steel pipe as the frame members 2-5, 11-15, and 21-24, etc., and steel plates for the planar floor 101, the entrance ramp 181 and the clamping sides 61 and 62. All permanent attachments of locking brackets, frame members to one another, hinges and bearing tracks to frame members and plates, etc., are accomplished by welding.

While the restraining apparatus 1 of the present invention has been shown and described as usable with veterinary operations on a pig 6, it should be apparent that it could be sized and oriented for use with any type of livestock including, without limitation, cattle, horses, sheep, goats, etc. Furthermore, while the body clamping sides 61 and 62 have been illustrated as having only one locking position, they could readily be equipped with multiple locking positions by positioning other brackets, such as the bracket 68, in intermediate positions along the path of operation of the operating lever 91.

It is to be understood that while certain forms of the present invention have been illustrated and described herein, it is not to be limited to the specific forms or arrangement of parts described and shown.

What is claimed and desired to be secured by Letters Patent is as follows:

1. An animal restraining apparatus comprising:
   (a) a frame forming a chute with an entrance and an exit opening;
   (b) a remotely operated entrance gate located at said entrance opening;
   (c) a remotely operated exit gate located at said exit opening;
   (d) a plurality of remote operating devices for said entrance gate and said exit gate being operable from a single location in close proximity to said apparatus to permit manipulation of said gates by a single operator from said location;
   (e) said entrance gate being vertically operably positionable between open and closed positions thereof along tracks mounted on said frame;
   (f) said remote operating device for said entrance gate comprising a cable and pulley system with a cable handle attached thereto; and
   (g) said entrance gate includes a latch which is releasable via said cable and pulley system, said latch being operable to secure said entrance gate alternatively in both of said open and closed positions.

2. The apparatus of claim 1, wherein:
   (a) said exit gate is hinged to said frame and includes a latch that secures said exit gate to said frame when said exit gate is closed; and
   (b) said remote operating device for said exit gate selectively opens said latch.

3. The apparatus of claim 2, wherein:
   (a) said exit gate includes a head clamp, said head clamp being operative to immobilize the head and neck of a restrained animal; and
   (b) said head clamp is remotely operated by a head clamp operating lever which is located in close proximity to the location of said plurality of remote operating devices.

4. The apparatus of claim 3, wherein:
   (a) said head clamp includes a locking bar which holds said head clamp in position when said head clamp operating lever is released; and
   (b) said locking bar is released by a handle which is located in close proximity to said head clamp operating lever.

5. The apparatus of claim 1, and further comprising:
   (a) a body clamp comprising at least one movable side which can be urged inward to put pressure on the body of a restrained animal; and
   (b) said body clamp is remotely operated by a body clamp operating lever which is located in close proximity to the location of said plurality of remote operating devices.

6. The apparatus of claim 1, and further comprising:
   (a) a movable floor which can be raised to an elevated position or lowered to ground level; and
   (b) said movable floor is remotely operated by a floor operating lever which is located in close proximity to the location of said plurality of remote operating devices.

7. An animal restraining apparatus comprising:
   (a) a frame forming a chute with an entrance and an exit opening;
   (b) an entrance gate located at said entrance opening and being vertically operable within tracks mounted on said frame with a remote entrance gate operating device comprising a cable and pulley system that terminates in a handle; said entrance gate including an entrance gate latch to secure said entrance gate in a closed position thereof and said gate opening device operably allowing selective release of said entrance gate latch;
   (c) an exit gate located at said exit opening and being hinged to said frame; said exit gate having an associated remote exit gate operating device that opens a latch that secures said exit gate to said frame when said exit gate is closed, said exit gate including a head clamp, said head clamp being operative to immobilize a head of a restrained animal, said head clamp being remotely operated by a head clamp operating lever;
   (d) a body clamp comprising at least one movable side that can be urged inward to put pressure on the body of a restrained animal, and said body clamp being remotely operated by a body clamp operating lever;
   (e) a movable floor which can be raised to an elevated position or lowered to ground level whereby an animal being restrained by said body clamp will be further immobilized by lowering said floor away from feet of the animal, said movable floor being remotely operated by a floor operating lever;
   (f) said entrance gate cable handle, said exit gate latch operating device, said head clamp operating lever, said body clamp operating lever, and said floor operating lever being located in a location in close proximity to each other on one side of the apparatus to permit manipulation by a single operator at said location.

8. An animal restraining apparatus comprising:
(a) a frame forming a chute with an entrance and an exit opening;
(b) a remotely operated entrance gate located at said entrance opening;
(c) a remotely operated exit gate located at said exit opening;
(d) a plurality of remote operating devices for said entrance gate and said exit gate being operable from a single location in close proximity to said apparatus to permit manipulation of said gates by a single operator from said location;
(e) a body clamp comprising at least one movable side which can be urged inward to put pressure on the body of a restrained animal;
(f) said body clamp being remotely operated by a body clamp operating lever; said lever being located in close proximity to the location of said plurality of remote operating devices;
(g) said body clamp includes two movable sides which are urged towards each other to put pressure on said animal;
(h) a spring latch being operable to hold said body clamp in position to maintain clamping pressure on a restrained animal; and
(i) said spring latch being released by a handle which is located in close proximity to said body clamp operating lever.

9. The apparatus of claim 8, and further comprising:
(a) a movable floor which can be raised to an elevated position or lowered to ground level whereby an animal being restrained by said body clamp will be further immobilized by lowering said floor away from the animal's feet; and
(b) said movable floor is remotely operated by a floor operating lever which is located in close proximity to the location of said plurality of remote operating devices.

10. The apparatus of claim 9, wherein:
(a) said movable floor includes a spring latch which holds said movable floor in said elevated position; and
(b) said spring latch is released by a handle which is located in close proximity to said floor operating lever.

11. The apparatus of claim 9, wherein:
(a) said body clamp supports an animal such that the animal being restrained by said body clamp is supported only by said body clamp when said floor is lowered; whereby
(b) the animal can be released to exit said exit gate under its own power merely by releasing said body clamp.

12. The apparatus of claim 9, and further comprising:
(a) an entrance ramp which is hinged to said frame and which can be lowered for permitting an animal to climb up to said elevated floor; and
(b) said entrance ramp, when raised, is secured by said entrance gate to permit said apparatus to be easily transported.

13. An animal restraining apparatus comprising:
(a) a frame forming a chute with an entrance and an exit opening;
(b) a remotely operated entrance gate located at said entrance opening;
(c) a remotely operated exit gate located at said exit opening;
(d) a plurality of remote operating devices for said entrance gate and said exit gate being operable from a single location in close proximity to said apparatus to permit manipulation of said gates by a single operator from said location;
(e) a movable floor which can be raised to an elevated position or lowered to ground level;
(f) said movable floor being remotely operated by a floor operating lever which is located in close proximity to the location of said plurality of remote operating devices;
(g) said movable floor including a spring latch that selectively holds said movable floor in said elevated position; and
(h) said spring latch being released by a handle which is located in close proximity to said floor operating lever.

14. An animal restraining apparatus comprising:
(a) a frame forming a chute with an entrance and an exit opening;
(b) a remotely operated entrance gate located at said entrance opening;
(c) a remotely operated exit gate located at said exit opening;
(d) a plurality of remote operating devices for said entrance gate and said exit gate being operable from a single location in close proximity to said apparatus to permit manipulation of said gates by a single operator from said location;
(e) a movable floor which can be raised to an elevated position or lowered to ground level;
(f) said movable floor being remotely operated by a floor operating lever which is located in close proximity to the location of said plurality of remote operating devices;
(g) an entrance ramp that is hinged to said frame and that can be lowered to permit an animal to climb up to said elevated floor; and
(h) said entrance ramp, when raised, being secured by said entrance gate to permit said apparatus to be easily transported.

15. An animal restraining apparatus comprising:
(a) a frame forming a chute with an entrance and an exit opening;
(b) a remotely operated entrance gate located at said entrance opening;
(c) a remotely operated exit gate located at said exit opening;
(d) a plurality of remote operating devices for said entrance gate and said exit gate being operable from a single location in close proximity to said apparatus to permit manipulation of said gates by a single operator from said location;
(e) a top gate which is hinged to said frame; and
(f) said top gate has a spring latch with a control lever which lever is located in close proximity to the location of said plurality of remote operating devices.

16. An animal restraining apparatus comprising:
(a) a frame forming a chute with an entrance and an exit opening at opposite ends thereof;
(b) a body clamp within said frame having at least one movable side that can be urged inward to put pressure on a body of a restrained animal;
(c) a movable floor within said frame which can be raised to an elevated position or lowered to ground level whereby an animal being restrained by said body clamp will be further immobilized by lowering said floor away from the animal's feet;

(d) said body clamp supporting an animal such that the animal is supported only by said body clamp when said floor is lowered; whereby (e) the animal can be then be released to exit said frame under its own power merely by releasing said body clamp;

(f) said body clamp being remotely operated by a body clamp operating lever;

(g) said movable floor being remotely operated by a floor operating lever that is positioned at a location in close proximity to said body clamp operating lever;

(h) said body clamp including a spring latch which holds said body clamp in position to keep pressure on an animal held thereby; and (i) said spring latch being released by a handle which is located in close proximity to said body clamp operating lever.

17. The apparatus of claim 16, wherein:

(a) said movable floor includes a spring latch which holds said movable floor in said elevated position; and (b) said spring latch is released by a handle that is located in close proximity to said floor operating lever.

18. An animal restraining apparatus comprising:

(a) a frame forming a chute with an entrance and an exit opening;

(b) an entrance gate located at said entrance opening and being vertically operable within tracks mounted on said frame with a remote entrance gate operating device comprising a cable and pulley system that terminates in a handle;

(c) an exit gate located at said exit opening and being hinged to said frame; said exit gate having an associated remote exit gate operating device that opens a latch that secures said exit gate to said frame when said exit gate is closed, said exit gate including a head clamp, said head clamp being operative to immobilize a head of a restrained animal, said head clamp being remotely operated by a head clamp operating lever;

(d) a body clamp comprising at least one movable side that can be urged inward to put pressure on the body of a restrained animal, and said body clamp being remotely operated by a body clamp operating lever;

(e) a movable floor which can be raised to an elevated position or lowered to ground level whereby an animal being restrained by said body clamp will be further immobilized by lowering said floor away from feet of the animal, said movable floor being remotely operated by a floor operating lever;

(f) a top gate which being hinged to said frame;

(g) said top gate having a spring latch with a control lever; and (h) said entrance gate cable handle, said exit gate latch operating device, said head clamp operating lever, said body clamp operating lever, said floor operating lever and said top gate spring latch control lever being located in a location in close proximity to each other on one side of the apparatus to permit manipulation by a single operator at said location.

* * * * *